(12) United States Patent
Thiesfeld

(10) Patent No.: US 7,024,505 B2
(45) Date of Patent: Apr. 4, 2006

(54) FAIR ARBITRATION METHOD IN A DISTRIBUTED ARBITRATION SYSTEM

(75) Inventor: Charles William Thiesfeld, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 302 days.

(21) Appl. No.: 10/246,839

(22) Filed: Sep. 18, 2002

(65) Prior Publication Data

US 2003/0188063 A1 Oct. 2, 2003

Related U.S. Application Data

(60) Provisional application No. 60/368,204, filed on Mar. 28, 2002.

(51) Int. Cl.
G06F 13/368 (2006.01)

(52) U.S. Cl. ............... 710/120; 710/119; 710/123; 710/125

(58) Field of Classification Search ......... 710/119, 710/107, 112–125, 240–244; 709/217, 218, 709/225, 226; 370/351–430
See application file for complete search history.

(56) References Cited

U.S. PATENT DOCUMENTS

| | | | | |
|---|---|---|---|---|
| 4,229,790 A | * | 10/1980 | Gilliland et al. | 718/101 |
| 4,604,689 A | * | 8/1986 | Burger | 710/300 |
| 4,621,342 A | | 11/1986 | Capizzi et al. | 362/900 |
| 4,656,622 A | * | 4/1987 | Lea | 370/353 |
| 4,672,536 A | * | 6/1987 | Giroir et al. | 710/241 |
| 5,274,774 A | | 12/1993 | Manber et al. | 395/325 |
| 5,414,694 A | | 5/1995 | Crayford et al. | 370/13.1 |
| 5,430,848 A | | 7/1995 | Waggener | 395/325 |
| 5,630,173 A | | 5/1997 | Oprescu | 395/860 |
| 5,644,731 A | | 7/1997 | Liencres et al. | 395/283 |
| 5,764,895 A | | 6/1998 | Chung | 395/700.8 |
| 5,778,200 A | * | 7/1998 | Gulick | 710/113 |
| 5,784,648 A | * | 7/1998 | Duckwall | 710/40 |
| 5,835,720 A | | 11/1998 | Nelson et al. | 395/200.54 |
| 5,862,404 A | | 1/1999 | Onaga | 395/828 |
| 5,936,960 A | | 8/1999 | Stewart | 370/438 |
| 5,970,232 A | * | 10/1999 | Passint et al. | 709/238 |
| 6,012,117 A | | 1/2000 | Traw et al. | 710/123 |
| 6,052,784 A | | 4/2000 | Day | 713/201 |

(Continued)

FOREIGN PATENT DOCUMENTS

WO    WO 99/11033    *  3/1999

OTHER PUBLICATIONS

IBM; "Distributed Star Network with Unrooted Tree Topology;" IBM Technical Disclosure Bulletin; vol. 22 Issue 12; pp. 5450-5452; May 1, 1980.*

(Continued)

Primary Examiner—Paul R. Myers
Assistant Examiner—Ryan Stiglic
(74) Attorney, Agent, or Firm—Todd R. Fronek; Westman, Champlin & Kelly

(57) ABSTRACT

A method of communicating between an initial device and a target device connected by a plurality of intermediate segments in a distributed arbitration system is provided. The method includes establishing an arbitration timer for a communication request by the initial device. Furthermore, use of each of the intermediate segments is arbitrated based on the arbitration timer.

22 Claims, 7 Drawing Sheets

U.S. PATENT DOCUMENTS

| | | | |
|---|---|---|---|
| 6,092,137 A | 7/2000 | Huang et al. | 710/111 |
| 6,157,989 A * | 12/2000 | Collins et al. | 711/151 |
| 6,269,099 B1 | 7/2001 | Borella et al. | 370/389 |
| 6,285,679 B1 * | 9/2001 | Dally et al. | 370/413 |
| 6,418,492 B1 | 7/2002 | Papa et al. | 710/103 |
| 6,654,353 B1 * | 11/2003 | Tokura et al. | 370/254 |
| 2002/0051427 A1 * | 5/2002 | Carvey | 370/254 |

OTHER PUBLICATIONS

Serial Attached SCSI Working Group, "Serial Attached SCSI", Technology Presentation, Dec. 2001.

H. Mason, "The Future of SCSI . . . ", datatech, Edition 1, pp. 59-64, date unknown.

* cited by examiner

FAIR ARBITRATION METHOD IN A DISTRIBUTED ARBITRATION SYSTEM

CROSS-REFERENCE TO RELATED APPLICATION

This application claims priority from U.S. Provisional Application 60/368,204 filed on Mar. 28, 2002 for inventor Charles W. Thiesfeld and entitled FAIR ARBITRATION METHOD IN A DISTRIBUTED ARBITRATION SYSTEM.

FIELD OF THE INVENTION

The present invention relates generally to data storage and processing systems, and more particularly but not by limitation to arbitration of shared resources.

BACKGROUND OF THE INVENTION

Disc drives communicate with host computers using various standardized interfaces. In some interfaces, devices (i.e. disc drives and host computers) in a system share a common pathway for delivering messages throughout the system. Since the devices share a common pathway, a method of determining what devices may use a path is needed.

Methods that determine what devices may use a path are called arbitration methods. Distributed systems decentralize certain processes including arbitration of resources. Systems having distributed arbitration have difficulty managing communication requests since each arbiter needs to be aware of other requests in the system in order to fairly and efficiently manage communication requests. Embodiments of the present invention address these and other problems, and offer other advantages over the prior art.

SUMMARY OF THE INVENTION

A method of communicating between an initial device and a target device connected by a plurality of intermediate segments in a distributed arbitration system is provided. The method includes establishing an arbitration timer for a communication request by the initial device. Furthermore, use of each of the intermediate segments is arbitrated based on the arbitration timer.

A system performing the above method is also disclosed. The system includes an initial device and a target device. A plurality of intermediate segments connects the initial device and the target device. Each intermediate segment has a controller adapted to receive a communication request having an arbitration timer from the initial device and arbitrate use of the respective intermediate segments based on the arbitration timer.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
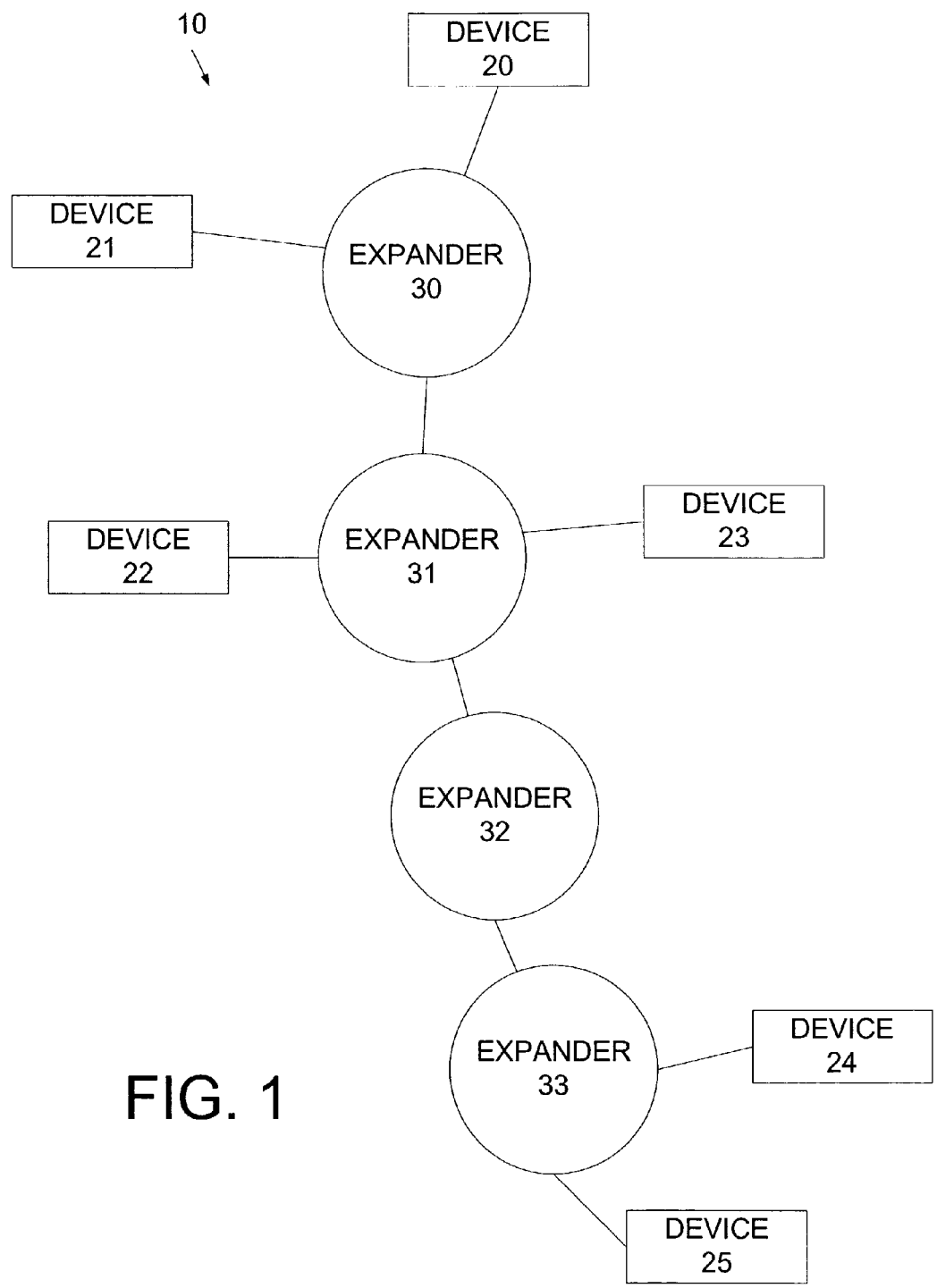
FIG. 1 is a block diagram of a storage and data processing system.

Embodiments of the present invention are useful in various data storage and processing systems. One particular embodiment is a mid-range storage server utilizing multiple disc drives and operating under a Small Computer System Interface (SCSI) protocol. Illustratively, the system uses the Serial Attached SCSI (SAS) interface wherein various devices are connected via high speed serial links. The system may include various devices such as hosts and disc drives. Hosts process data while disc drives provide data storage. The disc drives may use differing protocols such as SAS or Serial ATA.

Expanders allow hosts and disc drives to connect to one or more devices. Hosts and drives connect to the system through expanders and can be arranged in what is known as a "star" topology. Additionally, expanders may connect to other expanders. As a result, the connections in a system include host-expander, expander-expander and expander-disc drive.

In a SAS environment, each device must have a unique address. The unique address generally includes two components. The first component pertains to an expander address and the second component pertains to a device address. In one embodiment, an expander has an address assigned by a memory component on the expander, for example PROM, switches, flash or other component. The device address usually corresponds to a particular port located on the expander and may be a physical address referenced by the expander.

Each of the devices communicates via a serial connection. Resources of the serial connection need to be allocated to an initial device in order for the initial device to communicate with a target device. Utilizing the present invention allows resources of the system to be allocated fairly and efficiently. Additionally, timeout periods may be used to prevent errors in the system.

For illustrative purposes, reference herein is made to messages known as "primitives". However, those skilled in the art will realize that other types of messages can also be used and the invention is not limited as such. Primitives are packets of data transmitted throughout a system according to a particular protocol. Typically, primitives include 32-bits of data separated into 4 bytes (1 byte equals 8 bits of data) although various lengths of messages may be used and separated differently.

The first byte establishes that a primitive is being sent. The second byte identifies the particular type of primitive. Various types of primitives are used and include a change primitive, discovery primitive, status primitive, open primitive and others. The third and fourth bytes are associated with address parameters. In one embodiment, the third byte is an expander address and the fourth byte is a device address corresponding to an expander port. Accordingly, a particular device is referenced by the address of the expander and the port of the expander to which it connects. Illustratively, a zero address in either or both of the third and fourth bytes is reserved for certain situations.

FIG. 1 illustrates a system 10 for which embodiments of the present invention are useful. Illustratively, system 10 includes devices 20–25 and expanders 30–33. Devices 20–25 may be any computing device including a host device (such as a computer), disc drive or other device. Expanders 30–33 allow communication between one or several devices and other expanders. Illustratively, expanders 30–33 include ports having a bi-directional data path and allow one or more devices to be simultaneously connected to its respective ports. When a system or device is initialized (i.e. at power on or when a device is plugged into a configuration) a discovery process initiates in order for devices 20–25 to utilize the resources of other devices in system 10.

For purposes of clarification, devices communicate with each other through intermediate "segments". The collection of intermediate segments connecting two devices is referred to as a "path" or "pathway". Each intermediate segment includes an expander and a connector (the lines illustrated in FIG. 1). As an example, the path from device 20 to device 23 has two intermediate segments that include expanders 30 and 31. The path from device 20 to device 25 includes four intermediate segments that include expanders 30, 31, 32 and 33.

It is worth noting that expander 32 is not directly connected to one of the devices in the system. Thus, in many instances, expander 32 merely repeats the data sent to it between expanders 31 and 33. Accordingly, expander 32 need not participate in the arbitration process and thus the path from device 20 to device 25 need only be treated as having three intermediate segments including expanders 30, 31 and 33. However, if a device is connected to expander 32, expander 32 must begin to participate in the arbitration process.

Figure 2:
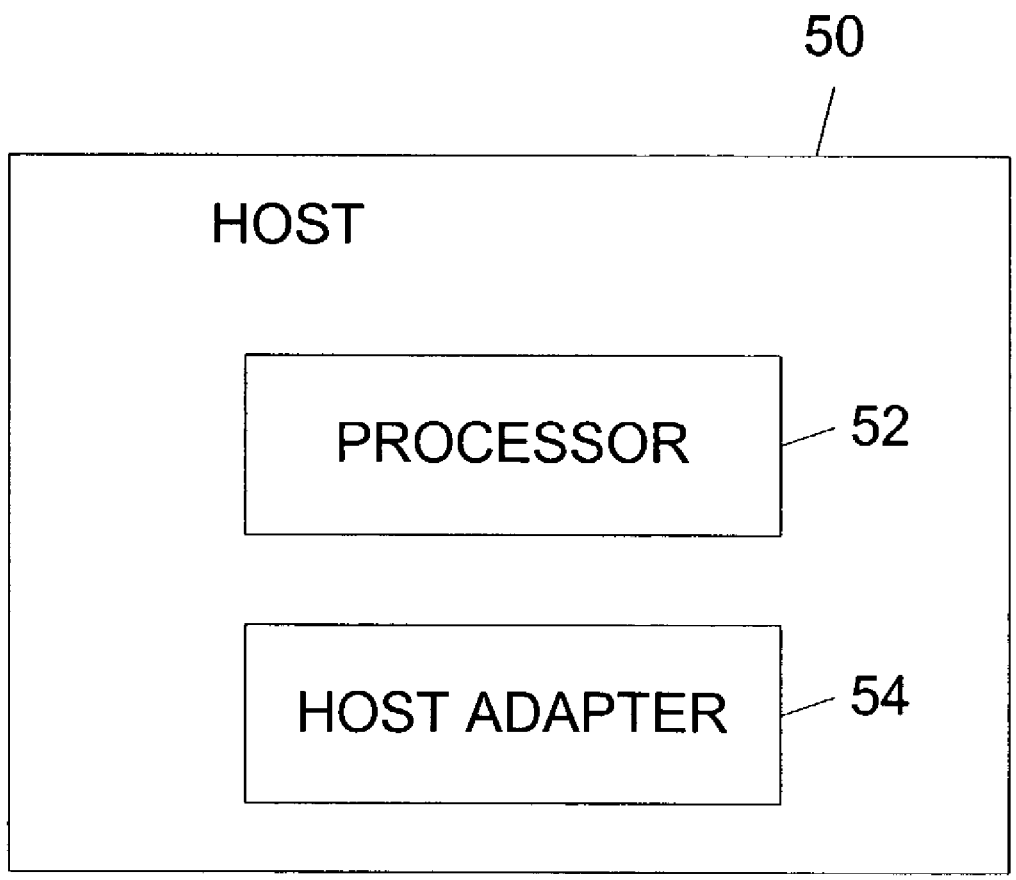
FIG. 2 is a block diagram of a host.

FIG. 2 is a block diagram of a host 50 for use in system 10 as previously described. Host 50 includes at least one processor 52 and a host adapter 54. Processor 52 is used to process data. Host adapter 54 allows host 50 to communicate with other devices in the system. Host adapter 54 typically connects to an expander in the system in order for processor 52 to be able to utilize disc drive resources in the system. For example, processor 52 may wish to access data stored on a disc drive in the system.

Figure 3:
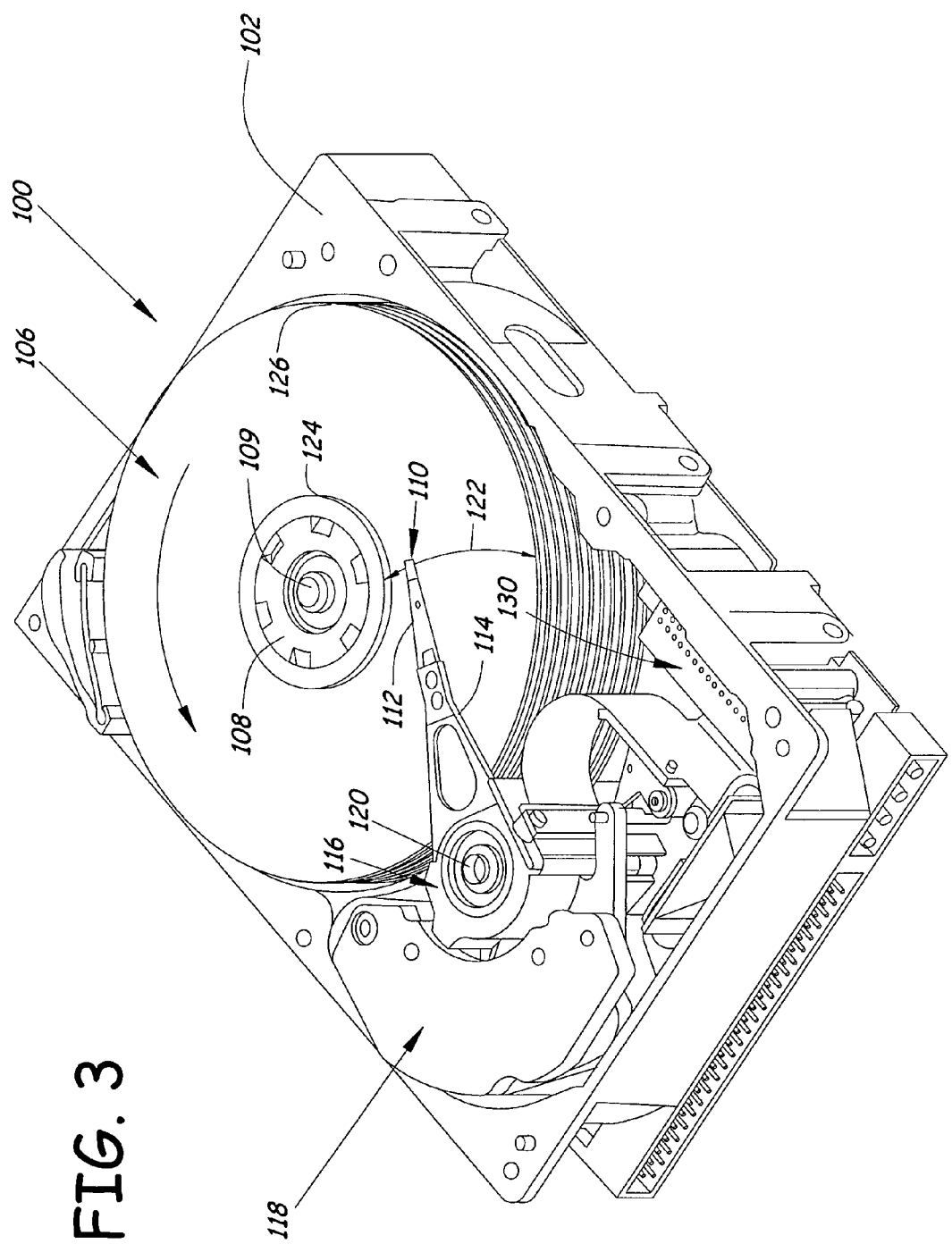
FIG. 3 is an isometric view of a disc drive.

FIG. 3 is an isometric view of one example of a disc drive 100 for use in system 10 as previously described. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 3, sliders 110 are supported by suspensions 112 which are in turn attached to track accessing arms 114 of an actuator 116. The actuator shown in FIG. 3 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 4:
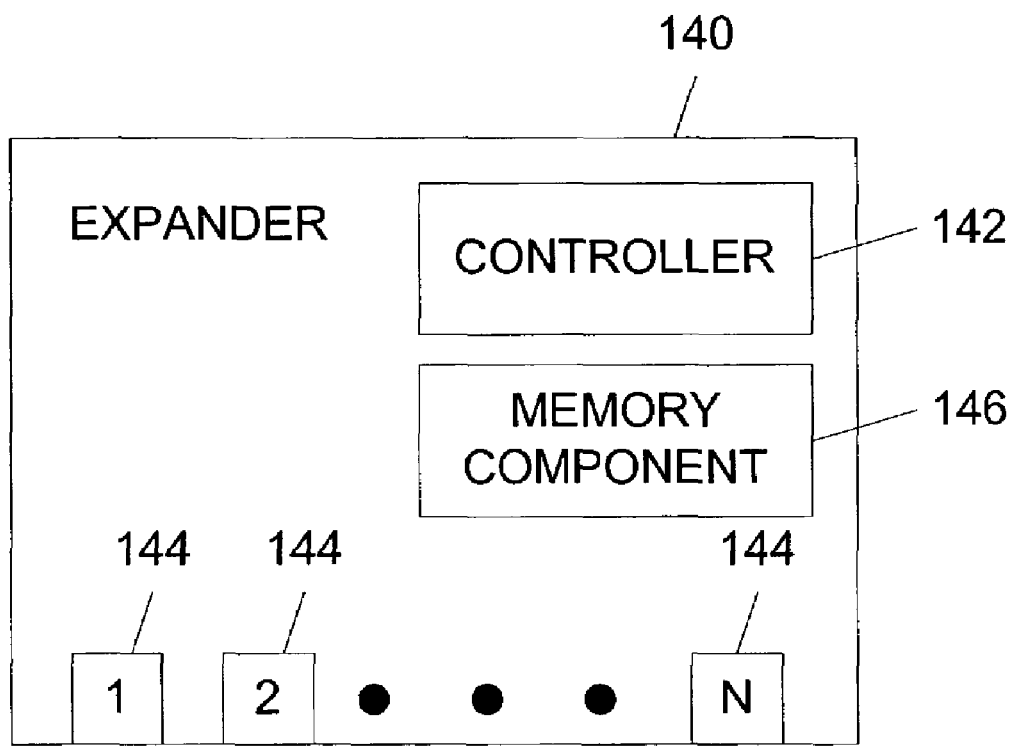
FIG. 4 is a block diagram of an expander.

FIG. 4 is a block diagram of an expander 140 for use in system 10 as previously described. Expander 140 includes controller 142 and a plurality of ports 144. Controller 142 controls data passing through expander 140 via the plurality of ports 144 and assists in assigning unique addresses in system 10 and allocating use of its resources to devices within system 10. Ports 144 have devices connected and provide communication to a plurality of devices. If desired, expander 140 may include a memory component 146 for assigning its respective address in the system. As noted earlier, this may be a physical addressing component such as a collection of switches or PROM. Illustratively, expanders include converters, bus extenders, repeaters and switches.

Figure 5:
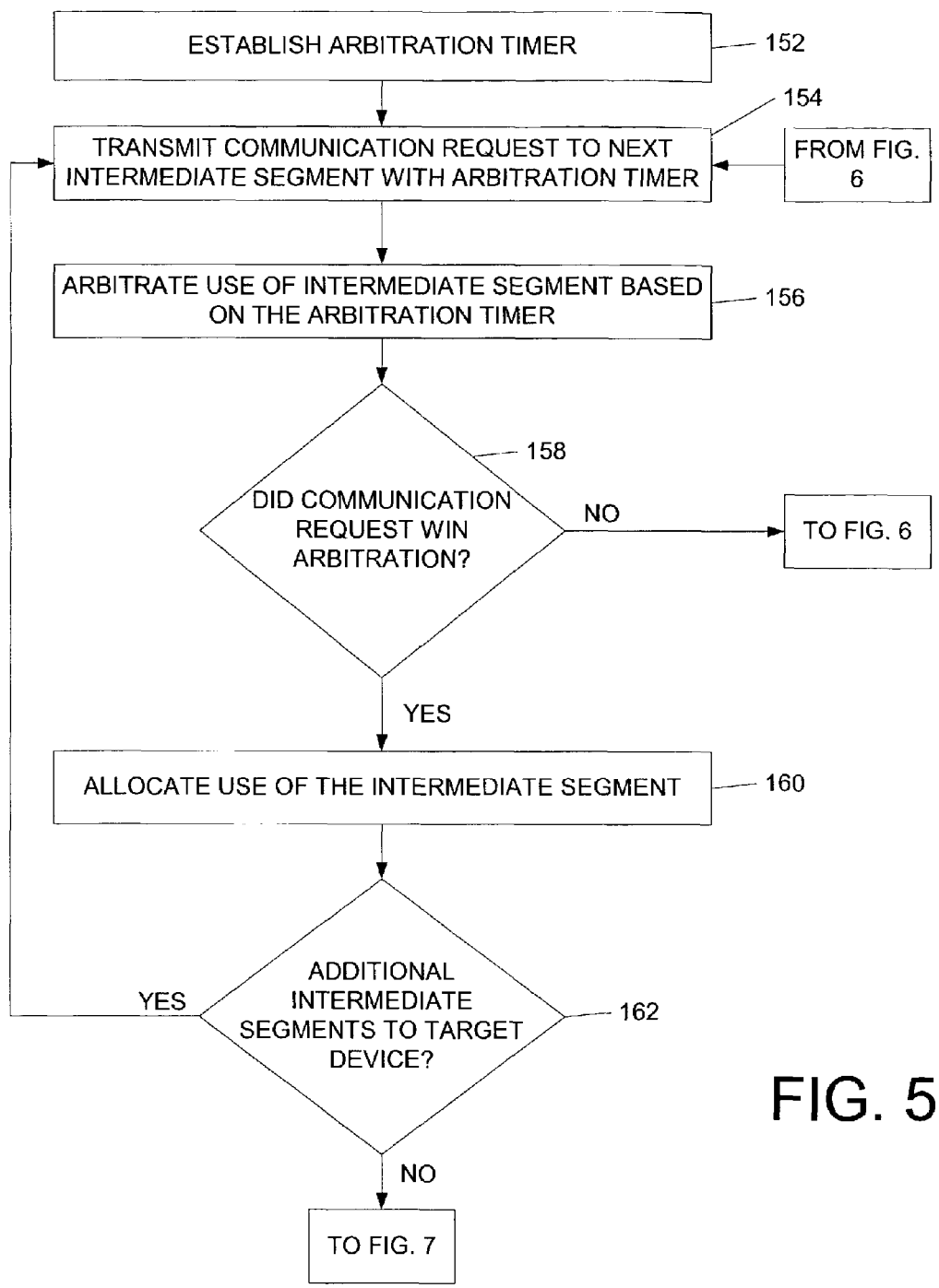
FIG. 5 is a flow chart of an arbitration process.

FIG. 5 illustrates an arbitration process according to the present invention. The arbitration process begins when an initial device wishes to communicate with a target device. At step 152, an arbitration timer is established for a communication request. Illustratively, the arbitration timer begins at zero. The arbitration timer will be used when arbitrating use of each intermediate segment between the initial device and the target device. Thus, the established arbitration timer has a similar value across the entire system and each expander recognizes the value uniformly. In one embodiment, the arbitration timer increases at a selected interval global to each expander.

At step 154, the communication request is transmitted to the next intermediate segment with the arbitration timer. In one embodiment, the communication request includes the address of the target device. The device itself communicates with its respective expander port. Each expander, knowing the target address, is able to forward messages to the next intermediate segment in the event there are additional segments determined at step 162 described below.

Next, at step 156, use of the intermediate segment is arbitrated based on the arbitration timer. The arbitration takes place within an expander of the intermediate segment. As part of the arbitration, the expander determines which communication request has won arbitration at step 158. If more than one communication request has been sent to the particular expander, the expander will determine which communication request has the largest arbitration timer (i.e. the arbitration timer with the longest time period value). This communication request is determined to have "won" arbitration. As explained earlier, the arbitration timer is transmitted throughout the system with its associated communication request. Thus, the arbitration timer has a global value and thus the oldest communication requests, regardless of origin, may have priority.

Figure 6:
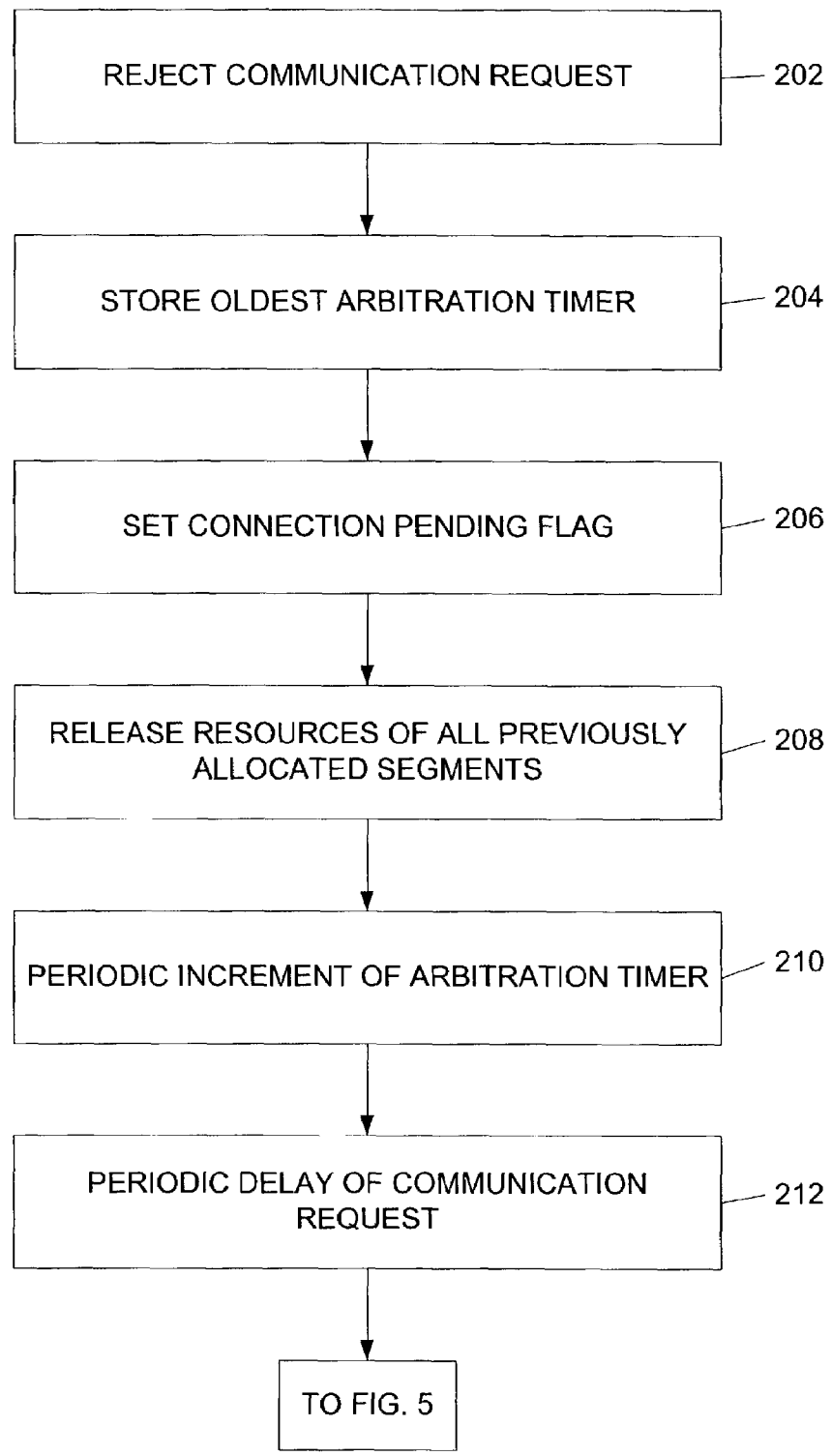
FIG. 6 is a flow chart of a process for rejecting a communication request.

If the communication request does not win arbitration, the method proceeds to FIG. 6. If the communication request does win arbitration, use of the particular intermediate segment is allocated to the initial device at step 160. In effect, this "ties up" the resources of the intermediate segment and the associated expander. Requests sent to the expander are rejected until the use of the expanders is freed at steps 206 and 258 as described below.

At step 162, the system determines whether there are additional intermediate segments to the target device. If there are additional segments, the method returns to step 154 and transmits the communication request to the next intermediate segment with the arbitration timer and performs arbitration as described above. If there are no further intermediate segments to the target device, the method proceeds to FIG. 7. In one embodiment, the communication path established between the initial device and the target device will remain open until the devices have completed transmission of necessary messages. This is further described below with regard to FIG. 7.

FIG. 6 illustrates a process according to the present invention that is used when a communication request does not win arbitration of an intermediate segment. For example, the particular expander may be allocated to a device or there may be older, pending requests. At step 202, the expander of the intermediate segment that rejects the communication request transmits a message indicative of the rejection. In one embodiment, the message is an open reject primitive.

At step 204, the arbitration timer having the longest or "oldest" arbitration timer not accepted is stored within the respective expander. Accordingly, the expander will be able to determine the largest arbitration timer upon subsequent communication requests. The particular expander that rejects the communication request may also set a connection pending bit or flag at step 206. Thus, once the use of the intermediate segment and associated expander is released, the particular expander will know that there is a pending communication request in the system at a particular port. Additionally, the pending bit allows the expander to know when it is unable to forward a communication request to a particular port.

Thus, the expander maintains a connection pending bit and the oldest arbitration timer within its memory. Those skilled in the art will appreciate that these values may be reset periodically. For example, the values may be reset to zero after the expander has not received any communication requests in a period of time and there are no communications pending in the system.

Additionally, at step 208, the resources of all previously allocated segments are released. This release frees up the use of intermediate segments that may be used on a different communication path. The connection pending bit and oldest arbitration timer may be maintained for further communication requests.

At step 210, the arbitration timer is increased periodically. The increment may be discrete or continuous depending on the system. In one embodiment, the arbitration timer increases by a set amount each period.

A delay of the next communication request may also be used at step 212. In one embodiment, an initial device includes an RC oscillator that randomly determines when to delay a particular communication request. This random delay prevents deadlock situations from occurring throughout the system. For example, two devices may request the use of the same intermediate segment at the same time. If they continually request the same intermediate segment at the same time, a deadlock situation can occur. By randomly delaying a communication request, these deadlock situations can be prevented. In one embodiment, the initial device randomly delays about 20% of the time. After determining whether a delay of the communication request is appropriate, the initial device returns to step 154 in FIG. 5 and transmits the communication request to the first intermediate segment with the arbitration timer.

Figure 7:
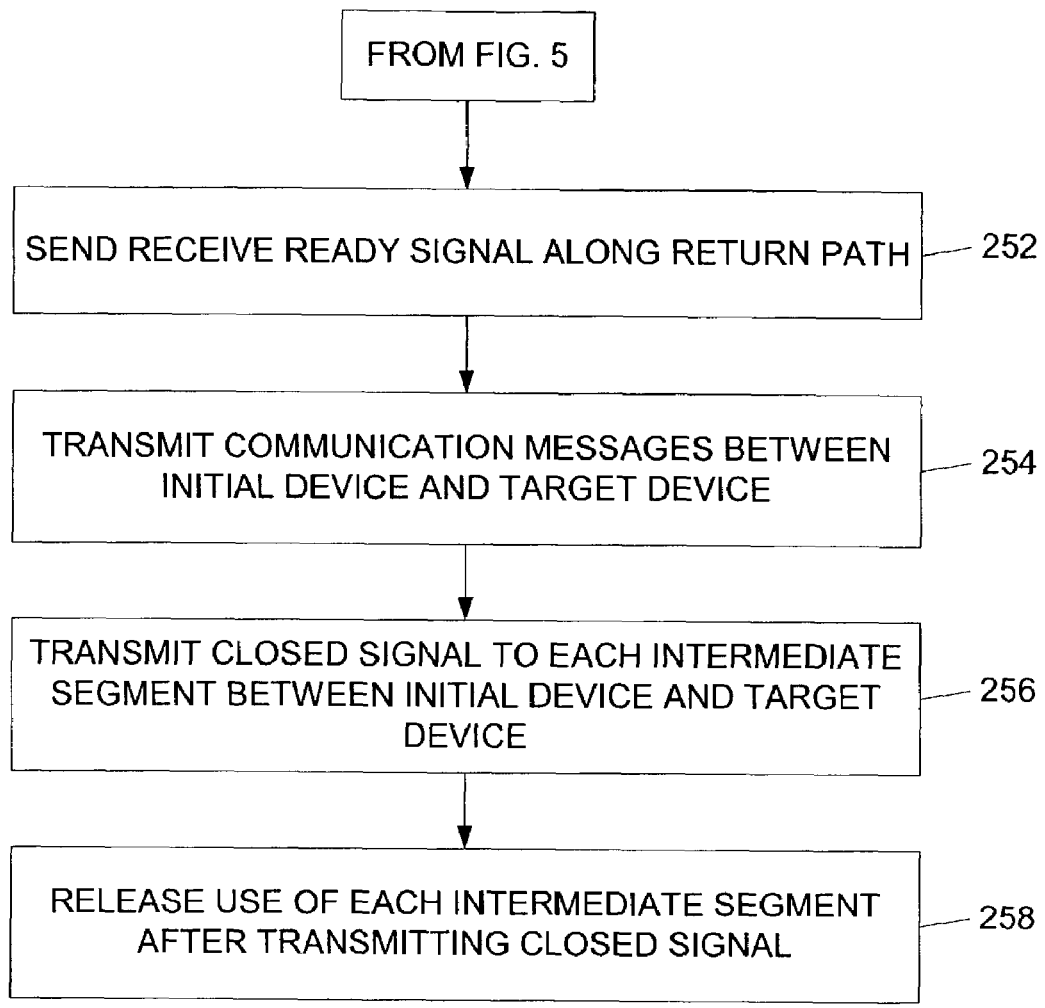
FIG. 7 is a flow chart of a process for communicating between two devices in a system.

FIG. 7 illustrates the process of transmitting communication messages after allocation of each of the intermediate segments to the initial device. This allocation forms a path between the initial and target device. At step 252, the target device sends a receive ready signal along the return path to the initial device. Once the initial device receives the receive ready signal, the initial device can begin transmitting communication messages to the target device at step 254. Once the initial device has transmitted each of its messages, a closed signal, herein a closed primitive, is sent to the target device at step 256. The target device, in turn, repeats the closed primitive to the initial device. As the return closed primitive returns along the communication path established, use of each of intermediate segment is released after the particular intermediate segment transmits the closed signal at step 258. Thus, each intermediate segment may now be used by other devices in the system.

With reference to FIG. 1, an example of the arbitration process according to the present invention will be described. In the example, device 20 wishes to communicate with device 25. Thus, device 20 is the initial device and device 25 is the target device. The process begins by establishing an arbitration timer. Illustratively, the arbitration timer is zero. Device 20 sends an arbitration primitive containing the arbitration timer to expander 30. Also, device 20 transmits an open primitive containing the target device address. The target device address of device 25 includes the address of expander 33 and the port to which device 25 connects.

Expander 30 then arbitrates the open primitive sent by device 20 based on the arbitration timer. The open primitive is rejected if the use of expander 30 is already allocated to another device in system 10. If one of the other devices has a request having an older arbitration timer, the open primitive sent by device 20 will also be rejected. Expander 30 will then set a connection pending bit. Additionally, expander 30 will store the value of the arbitration timer, unless an arbitration timer is already stored with a greater value.

If the open primitive wins arbitration, the use of expander 30 is allocated to device 20. Then, expander 30, knowing the target address, sends the arbitration primitive having the arbitration timer and the open primitive to expander 31. Again, expander 31 will reject the request if its use is allocated to another device or if another device has a request having an older arbitration timer. If expander 31 rejects the open primitive, expander 30 will notify device 20 and also free up use of its resources so other devices may utilize its resources. This process repeats for expanders 32 and 33 in order to communicate with device 25.

If, at any time, the open primitive is rejected, the use of the previous segments is freed to allow the expanders to be used by other devices. For example, if the use of expanders 30, 31 and 32 is allocated to device 20 and device 24 is communicating with device 25 using expander 33, the use of expanders 30, 31 and 32 would be freed such that, for example, device 21 could communicate with device 20 while the communication between devices 24 and 25 is pending.

Ultimately, once device 25 has received the open primitive sent by device 20, a receive ready signal is sent to device 20 by device 25. The use of expanders 30–33 has been allocated to device 20 and remains allocated until it has completed its communication with device 25. When device 25 repeats a closed primitive back to device 20, the use of expanders 30–33 is released.

In summary, a method of communicating between an initial device (20–25, 50, 100) and a target device (20–25, 50, 100) connected by a plurality of intermediate segments (30–33, 140) in a distributed arbitration system (10) is provided. The method includes establishing an arbitration timer for a communication request by the initial device (20–25, 50, 100). Furthermore, use of each of the intermediate-segments (30–33, 140) is arbitrated based on the arbitration timer.

A system (10) performing the above method is also disclosed. The system (10) includes an initial device (20–25, 50, 100) and a target device (20–25, 50, 100). A plurality of intermediate segments (30–33, 140) connects the initial device (20–25, 50, 100) and the target device (20–25, 50, 100). Each intermediate segment (30–33, 140) has a controller (142) adapted to receive a communication request having an arbitration-timer from the initial device (20–25, 50, 100) and arbitrate use of the respective intermediate segments (30–33, 140) based on the arbitration timer.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage and processing system while maintaining substantially the same functionality without departing from the scope and spirit of the present invention. In addition, although the preferred embodiment described herein is directed to a data storage and processing system for communicating between attached devices, it will be appreciated by those skilled in the art that the teachings of the present invention can be applied to other systems, without departing from the scope and spirit of the present invention.

What is claimed is:

1. A method of communicating between an initial device and a target device connected by a plurality of intermediate segments in a distributed arbitration system, comprising:
    establishing an arbitration timer for a communication request by the initial device;
    arbitrating use of each of the intermediate segments based on the arbitration timer; and
    allocating use of each intermediate segment to the initial device based on the arbitration timer such that other communication requests for use of at least one of the plurality of intermediate segments are rejected.

2. The method according to claim 1, wherein arbitrating comprises:
    requesting use of each intermediate segment between the initial device and the target device using the arbitration timer.

3. The method according to claim 1, and further comprising:
    transmitting an acknowledgement from the target device to the initial device indicating that each intermediate segment between the initial device and target device has been allocated to the initial device.

4. The method according to claim 1, wherein arbitrating comprises:
    requesting use of a first intermediate segment between the initial device and the target device using the arbitration timer; and
    determining if the communication request wins arbitration of the first intermediate segment based on the arbitration timer.

5. The method of claim 4, wherein if it is determined that the communication request wins arbitration, then arbitrating further comprises:
    allocating use of the first intermediate segment to the initial device; and
    requesting use of a second intermediate segment connected to the first intermediate segment.

6. The method according to claim 5, wherein requesting use of the second intermediate segment further comprises transmitting the arbitration timer to the second intermediate segment.

7. The method according to claim 6, wherein arbitrating further comprises:
    determining if the communication request wins arbitration of the second intermediate segment based on the arbitration timer.

8. The method according to claim 5, wherein if it is determined that the communication request does not win arbitration of the second intermediate segment, then use of the first intermediate segment by the initial device is released.

9. The method according to claim 5, wherein arbitrating further comprises:
    determining if the communication request wins arbitration of the second intermediate segment based on the arbitration timer.

10. The method according to claim 1 and further comprising:
    allocating use of at least one intermediate segment to the initial device; and
    releasing use of each intermediate segment that has been allocated when the communication request does not win arbitration of one of the intermediate segments.

11. The method according to claim 2 and further comprising:
    delaying a period of time before requesting use of each intermediate segment.

12. A system, comprising:
    an initial device;
    a target device; and
    a plurality of intermediate segments connecting the initial device and the target device, each intermediate segment comprising:
        a controller adapted to receive a communication request having an arbitration timer from the initial device, arbitrate use of the respective intermediate segments based on the arbitration timer and allocate use of its respective intermediate segment such that other communication requests for use of the respective intermediate segment are rejected.

13. The system of claim 12, wherein each controller is further adapted to receive an acknowledgment from the target device indicating that each intermediate segment has been allocated to the initial device and adapted to transmit the acknowledgment to the initial device.

14. The system of claim 12, wherein each controller is further adapted to determine if the arbitration timer received with the communication request is the oldest arbitration timer when compared to at least one other arbitration timer.

15. The system of claim 12, wherein the initial device is adapted to delay a period of time before initiating a communication request.

16. The system of claim 12, wherein each controller is further adapted to store the oldest arbitration timer of a pending communication request.

17. The system of claim 12, wherein each controller is further adapted to allocate use of its respective intermediate segment to the initial device and request use of a next intermediate segment.

18. The system of claim 12, wherein each controller is further adapted to transmit the arbitration timer to a next intermediate segment.

19. A system, comprising:
    an initial device;
    a target device;
    a plurality of intermediate segments connecting the initial device to the target device; and
    means for arbitrating use of each of the plurality of intermediate segments using an arbitration timer; and
    means for allocating use of the plurality of intermediate segments such that other communication requests for the plurality of intermediate segments are rejected.

20. The system of claim 19 wherein the initial device transmits a communication request having the arbitration timer to a first intermediate segment.

21. The system of claim 19 and further comprising means for rejecting a communication request if use of one of the plurality of intermediate segments has been allocated.

22. The system of claim 19 and further comprising means for releasing use of previously allocated intermediate segments if a communication request is rejected.

* * * * *